Sept. 6, 1966  A. E. LOPEZ  3,271,532
THREE-AXIS FINGER TIP CONTROLLER FOR SWITCHES
Filed Feb. 18, 1965  2 Sheets-Sheet 1

INVENTOR.
ARMANDO E. LOPEZ
BY
ATTORNEYS

Sept. 6, 1966  A. E. LOPEZ  3,271,532
THREE-AXIS FINGER TIP CONTROLLER FOR SWITCHES
Filed Feb. 18, 1965  2 Sheets-Sheet 2

INVENTOR.
ARMANDO E. LOPEZ
BY
ATTORNEYS

United States Patent Office 3,271,532
Patented Sept. 6, 1966

3,271,532
THREE-AXIS FINGER TIP CONTROLLER FOR SWITCHES
Armando E. Lopez, Sunnyvale, Calif., assignor to the United States of America as represented by the Administrator of the National Aeronautics and Space Administration
Filed Feb. 18, 1965, Ser. No. 433,821
8 Claims. (Cl. 200—6)

This invention described herein may be manufactured and used by or for the Government of the United States of America for governmental purposes without the payment of any royalties thereon or therefor.

This invention relates to remote control devices. More particularly the invention relates to a controller which is operated by movement of the finger tips as distinguished from movement of the entire hand. The control device of this invention was particularly designed for and is particularly useful in connection with the manual control of the attitude of a space vehicle having an on-off control system.

Two types of controls systems have been considered in connection with the control of space vehicles. One type is the proportional control system in which the amount of control actually imparted is proportional to the amount of movement given by the operator to the handle of the controller. For example, if the handle of the controller were connected to a system for causing angular movement of a rudder or aileron, the greater the angular movement given to the handle the greater would be the angular movement imparted to the rudder or aileron. The other type of control system is called the on-off system wherein the amount of control actually imparted to the vehicle-directing element is fixed. In other words the amount of movement of the actual control does not vary in relation to the movement of the handle of the controller. In the on-off system, movement of the handle of the controller, to a predetermined amount simply imparts an "on" control signal to the system which causes the actual vehicle guiding element to impart its fixed effect for as long as the handle is held in the "on" position.

On-off control systems per se are not new with this invention. However, in the past controllers for on-off systems have generally been of two configurations; namely, a three-axis grip type controller where the input signals are applied with the hand movement rather than with the finger tips, or a two-axis finger tip control combined with foot pedals for control about a third axis. The main difficulty with the three-axis hand grip controller is that it is difficult to input signals into just two axes without inadvertently introducting signals into the third axis. The difficulty with the combined foot and finger control system is that it is difficult to input small duration signals with the feet.

Accordingly, an object of the present invention is to provide a controller which corrects the difficulties encountered in connection with prior controllers as mentioned in the preceding paragraph.

More specifically an object of the invention is to provide a controller in which control is provided about three-axes entirely at the command of finger tip movement. In this way the operator is able to input discrete signals into each axis separately with the finger tips of one hand without the undesirable effect of inadvertent inputs about one axis while inputing signals about the other two axes. In addition small duration signals may be input about any one of three axes. In situations where the operator works in a pressurized suit, it is particularly important that he be able to input control signals by finger movements rather than by whole hand movements because in a pressure suit the operator can lose much of his sense of feel in connection with movement of his entire hand.

By way of brief description a controller according to the invention comprises a first control member which is conveniently engageable by the index finger of the operator. The first control member is supported for movement selectively in either of two planes. Signalling means are provided which are responsive to movement of the first control member for transmitting a control command to an element to be controlled such as a rudder, aileron or the valve on a jet nozzle. A second control member is arranged adjacent the first control member in a manner such that it is engageable by the thumb and second finger of an operator whose first or index finger is in engagement with said first control member. The second control member is pivotally supported for rocking motion in response to alternative input from the thumb or second finger of the operator. The apparatus includes signalling means responsive to rocking movement of the second control member for transmitting a control command to the element to be controlled thereby.

Other and further objects and features of advantage will become apparent from the following detailed description wherein reference is made to the accompanying drawings in which:

FIGURE 1 is a perspective view of a finger tip controller according to the invention and shows the manner in which the pilot places his fingers to actuate the device. FIG. 1 also includes a schematic representation of a space vehicle being controlled by the finger tip controller of the invention. One intended arrangement is one in which the controller is actually inside the space vehicle and is operated by the pilot in the vehicle.

Figure 1:
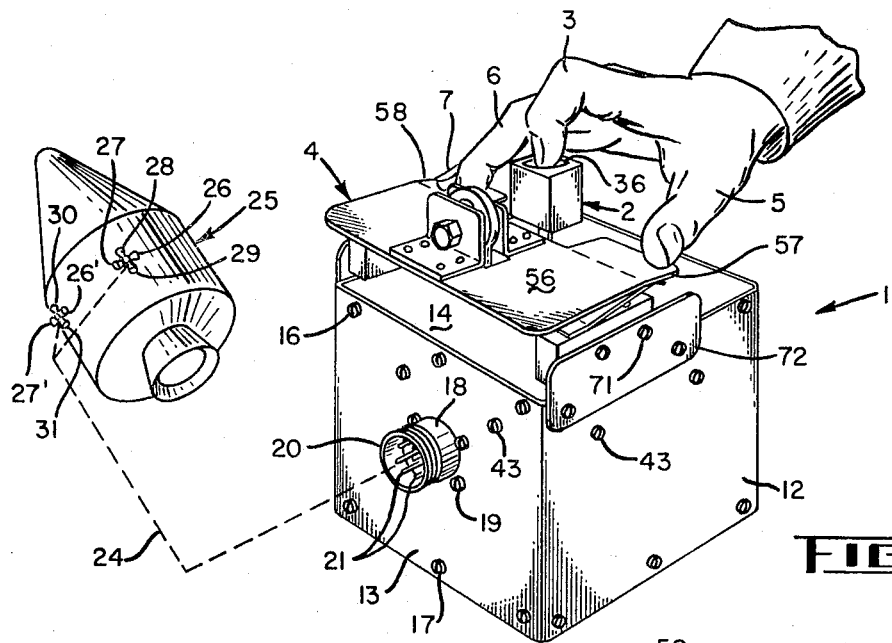

Referring in more detail to the drawings, FIG. 1 shows a three-axis finger tip controller 1 made in accordance with the invention. The controller comprises a first control member 2 which is engageable by the first or index finger 3 of an operator. The controller comprises an additional control member 4 which is engageable by the thumb 5 and the second finger 6 of the operator whose first finger 3 is in engagement with the first control member 2. It is usually comfortable for the operator to place his third finger 7 on the control member 4 adjacent his second finger 6. The controller 1 comprises an outer metal casing formed by side walls 10–13, a top wall 14 and a bottom wall 15. The side walls are bonded together to form an integral unit, and the top wall is removably attached to the side walls by screws 16. Similarly, the bottom wall 15 is attached to the side walls by screws 17.

A conventional electrical terminal unit 18 is attached to side wall 13 by screws 19. Member 18 comprises a threaded connector sleeve 20 surrounding terminal pins 21. As will be hereinafter described in more detail there are preferably 12 active terminal pins 21. The electrical output signals from the controller are, of course, transmitted through the pins 21. As indicated schematically in FIG. 1, the output signals from the various terminal pins are conducted as indicated by the dash line 24 to elements to be controlled. In the example shown, the line 24 leads to control valves (not shown) which control flow through the jet reaction nozzles on a space craft indicated at 25.

For example, the controller is used to control valves for roll nozzles 26, 26', 27 and 27'. The controller also controls the valves for pitch nozzles 28 and 29, and yaw nozzles 30 and 31. In actual practice the controller 1 would be located in the space vehicle 25 in case of manned flight and would be operated by the pilot in the space vehicle.

Figure 2:
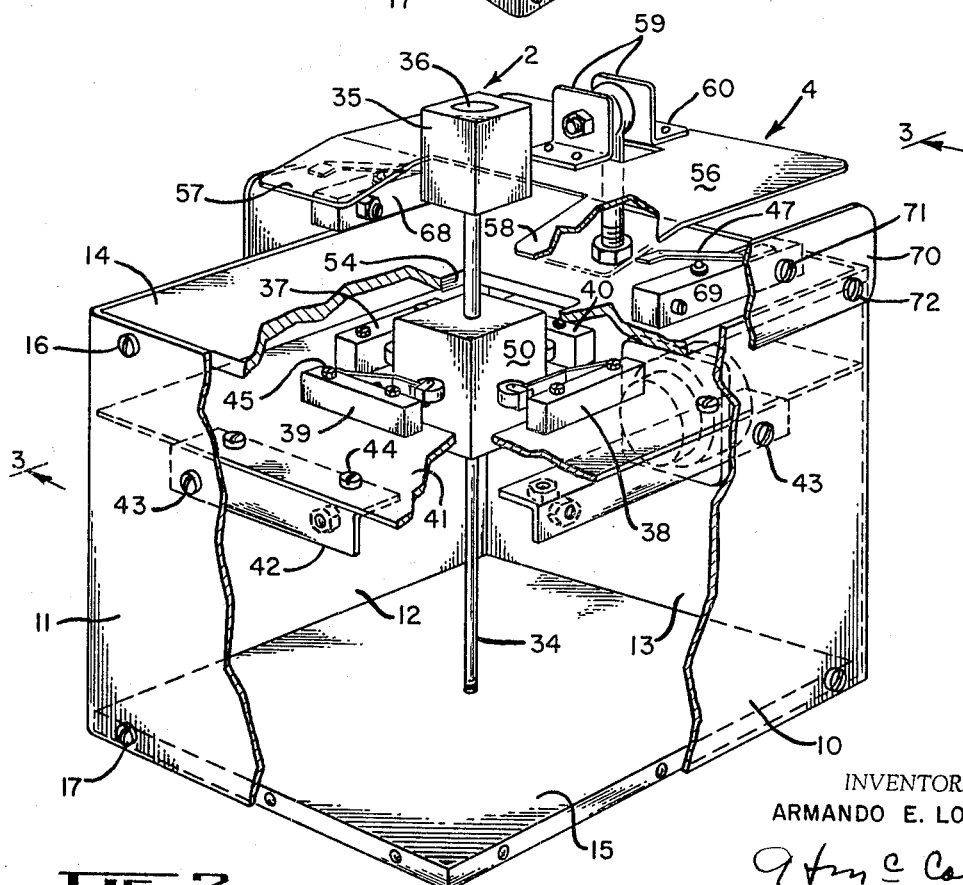
FIGURE 2 is a perspective view of the controller of FIG. 1 but on enlarged scale and with various parts cut away to show the internal construction. It will be noted that in FIG. 2 the controller is viewed from a different side than in FIG. 1.
Figure 3:
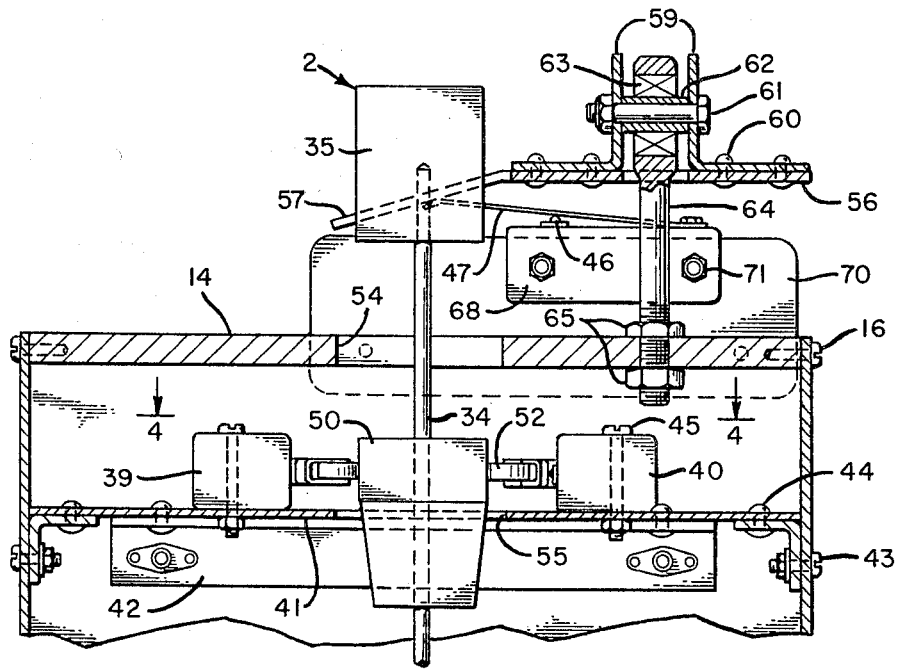
FIGURE 3 is a cross sectional view taken on line 3—3 of FIG. 2.
Figure 4:
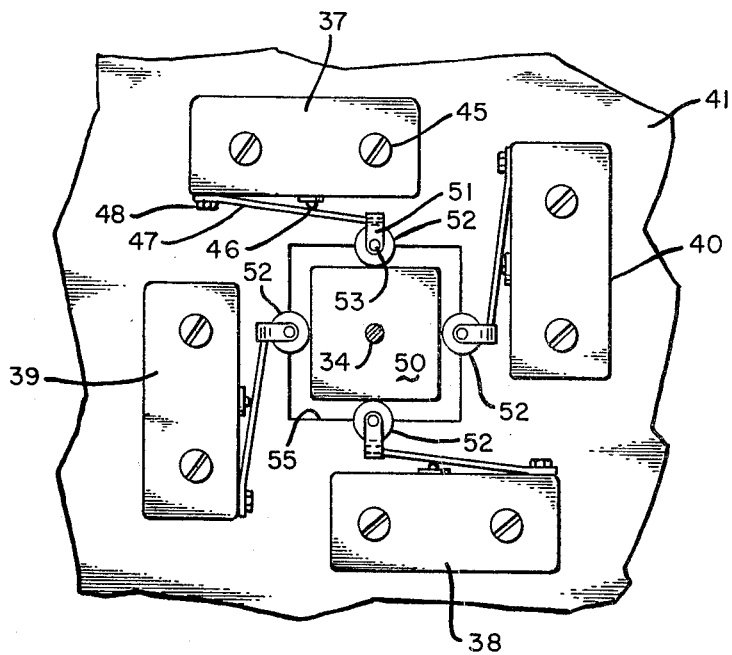
FIGURE 4 is a view taken on the line 4—4 of the FIG. 3 and looking downwardly from a plane just beneath the top wall of the casing of the controller.

Referring in more detail to the FIGS. 2–4, the finger tip controller comprises a resilient metal rod 34 which is threaded into the bottom wall 15. Rod 34 forms the basis of the first control member 2. In order to make the rod 34 more easily engageable by the operator's index finger, an enlarged finger contacting member 35 is threaded on the end of rod 34. Member 35 can conveniently be made of a plastic material such as Lucite. The finger member 35 is preferably provided with a finger-receiving recess 36. The resilient metal rod 34 provides a built-in centering action for the control member 2. In order to achieve a control signal from movement of the control member 2, four conventional on-off switches 37–40 are associated with the control member 2. The switches are mounted inside the controller casing on a metal platform 41. The platform 41 is held in place by four angle brackets 42 attached one to each of the side walls 10–13. Brackets 42 are held in place by screws 43, and platform 41 is held on the brackets by screws 44. The switches 37–40 are attached to platform 41 by screws 45.

It will be seen that one pair of the electrical switches, 37 and 38, are arranged on opposite sides of rod 34 on a line passing through the rod. Similarly, the other pair of the electrical switches, 39 and 40, are arranged on opposite sides of the rod 34 on a line passing through the rod at right angles to the line containing switches 37 and 38, as shown best in FIG. 4. All four of the switches are the same and each is of conventional construction. More specifically each of the switches comprises an operating button 46 which is spring pressed outwardly of the switch casing to hold the switch in normally open position. Cooperating with button 46 is a flexible metal leaf 47 secured to the switch casing by a screw 48. Thus, as the free end of leaf 47 is pressed toward the switch casing, the leaf will engage the button 46. Continued motion of the leaf will force button 46 against its spring bias into the switch casing to place the switch in closed position. If additional force is placed on leaf 47 it will simply cause the free end of the flexible leaf to deflect without placing an appreciably greater force on the switch button 46.

In order to provide a practical cooperation between the control rod 34 and the switches 37–40, a generally cube-shaped nylon abutment member 50 is mounted on rod 34. In addition, a small yoke 51 is welded to the end of each leaf 47 and a roller wheel 52 is pivotally carried between the legs of the yoke by a pivot pin 53. The wheels 52 provide smooth action and prevent unintentional actuation of the switches by excess friction between abutment member 50 and leaves 47. In addition to the self-centering action of rod 34 itself, the internal springs in the switches 37–40 and the leaves 47 provide additional centering forces. The top 14 and partition 41 are provided with openings 54 and 55, respectively, to accommodate the movement of rod 34 and member 50 to operate the switches.

It will now be obvious to those skilled in the art that the control member 2 can be moved by the index finger back and forth in a vertical plane passing through the rollers for switches 37 and 38, and also in a vertical plane passing through the rollers for the switches 39 and 40. By way of example, the switches 37 and 38 can be connected in a system for controlling the roll of a space vehicle. More specifically, switch 37 can be connected in a circuit so that when the control member 2 is moved to the left as viewed in FIG. 2, and switch 37 is thus closed, the valves for jet nozzles 26 and 26' will be operated to emit a jet to cause the space vehicle 25 to roll counter-clockwise. When the finger force on control member 2 is released, the control member will return to centered position, whereby the switch button 46 on switch 37 will be free to return to the open position, and the valves for the jet nozzles will return to their closed positions. The two lead wires for each of the switches are connected to two of the terminal pins 21. The wires are omitted from the drawings to simplify the disclosure.

When the control member 2 is moved to the right, the switch 38 will close and will signal jet thrust from nozzles 27 and 27' to roll the vehicle clockwise. When the control member 2 is moved rearward, the switch 39 will close and will signal jet thrust from nozzle 28 to pitch the nose of the vehicle upward. When the control member 2 is moved forward, the switch 40 will close and will signal jet thrust from nozzle 29 to pitch the nose of the vehicle downward.

Thus the controller 1 provides control about two axes, such as the roll and pitch axes, by means of control member 2. Control about a third axis such as a yaw axis is provided by the control member 4 which will be described now in more detail. Member 4 comprises a metal plate 56 having tabs 57 and 58 thereon projecting along opposite sides of the index finger member 35 so that the thumb and second finger rest naturally on the tabs 57 and 58, respectively, when the index finger is placed on the finger member 35 of control member 2.

The finger plate 56 of control member 4 is pivotally attached to the controller casing for rocking movement by depressing either the thumb or the second finger. More specifically, a pair of angle brackets 59 are attached to the plate 56 by rivets 60. A pivot bolt 61 is positioned through brackets 59 and is surrounded by a spacing sleeve 62. A conventional low friction bearing such as a ball bearing 63 surrounds sleeve 62 and carries the eye end of an eye bolt 64. The other end of bolt 64 is secured to the top 14 of the casing by nuts 65. Thus the finger plate 56 is freely pivotable about the axis of bolt 61.

In order to obtain a control signal from pivotal movement of the finger plate 56, a pair of switches 68 and 69 are positioned for actuation by the finger plate. The switches 68 and 69 are attached to mounting brackets 70 by screws 71. The mounting brackets are positioned on the casing by screws 72 through the side walls and into the top wall 14. The switches 68 and 69 are identical to switches 37–40 except that yokes 51 and roller wheels 52 are not required.

The switches 68 and 69 are so positioned relative to the finger plate 56 that the leaf 47 of switch 68 is engageable by tab 57 and the leaf 47 of switch 69 is enagageable by tab 58. In fact, in released position the plate is held centered by spring force on the leaves 47 of the switches 68 and 69, with both of the switches in the open or "off" position. When it is desired to impart a control signal by manipulating the plate 56, the thumb 5 or second finger 6 is pressed down. For example, the plate 56 of control member 4 can be used to control the yaw of the vehicle 25. More specifically, when tab 57 is depressed by the thumb 5, switch 68 is closed and signals jet thrust from the yaw nozzle 30. Similarly, when the second finger 6 is pressed down on tab 58 the switch 69 is closed and signals jet thrust from the yaw nozzle 31. The yaw control impulse is of course removed when the depressed thumb or second finger is raised to relieve the rocking downward pressure on the plate 56 and the plate is allowed to return to its horizontal position, thereby opening the switches 68 and 69.

Although specific details of the present invention are shown and described herein, it is to be understood that modifications may be made therein without departing from the spirit and scope of the invention as set forth in the appended claims.

Having thus described the invention, what is claimed as new and desired to be secured by Letters Patent is:

1. A finger-tip controller comprising a first control member engageable by the index finger, means supporting said first control member for sideways movement selectively in either of two planes, means responsive to movement of said first control member in said two planes for transmitting a control command to an element to be controlled, a second control member projecting on two sides of said first control member and spaced around the first control member to permit said movement of the first control member, said second control member being engageable by the thumb and second finger of an operator whose index finger engages said first control member, means pivotally supporting said second control member for rocking motion about an axis extending toward said first control member, and means responsive to said rocking motion of said second control member for transmitting a control command to an element to be controlled.

2. A finger-tip controller as claimed in claim 1 in which said first control member comprises a resilient rod secured at one end and an enlarged finger-engaging portion on the other end of said rod.

3. A finger-tip controller comprising a casing having a top, bottom and side walls, a partition wall intermediate said top and bottom, a flexible control rod secured to said bottom wall and extending upwardly through apertures in said partition and top, four switches mounted on said partition around said aperture therein, abutment means on said rod engageable with said switches on the partition wall, an eye bolt secured to said top wall with the eye end thereof positioned above the top wall, a finger plate mounted on said eye bolt for pivotal movement about the axis of the eye of the bolt, said axis of the eye bolt extending toward said control rod, and a switch mounted on said casing on each side of said pivot axis for alternative engagement by said finger plate as said plate member is pivoted in opposite directions.

4. A finger-tip controller as claimed in claim 3 in which said finger plate comprises two spaced tabs projecting along opposite sides of said control rod.

5. A finger-tip controller comprising a support frame, a first control member having a finger-tip engageable surface, means supporting said first control member on said frame for sideways movement selectively in different directions, switch means operable by movement of said first control member in each of said directions, second and third control members each having a finger-tip engageable upper surface means supporting said second and third control members on said frame for substantially up and down movement relative to said sideways movement, said second and third control members being positioned closely adjacent said first control member whereby each of said three control members can be simultaneously engaged by separate fingers on one hand of an operator, and switch means for each of said second and third control members positioned for operation by said up and down movement of their respective second and third control members.

6. A finger-tip controller comprising a support frame, a control member having a finger-tip engageable surface, rod means resiliently supporting said control member on said frame for sideways movement in different directions, switch means operable by movement of said control member in each of said directions, a control plate having finger-tip engageable portions on opposite sides of said control member, pivot means supporting said control plate on said frame, said pivot means having its pivot axis extending toward said rod means, and switch means on each side of said pivot axis and operable by rocking movement of said control plate about said pivot axis.

7. A finger-tip controller as claimed in claim 6 in which said rod means supports said control member for movement in opposite directions in each of two orthogonal planes, said switch means operable by movement of said control member comprise two switches mounted on said frame in each of said orthogonal planes on opposite sides of said rod means, and said pivot axis is substantially aligned with one of said planes.

8. A finger-tip controller as claimed in claim 7 in which said rod means and said switch means for said control member cooperate to position said control member in a hands off position centered between said four switches for the control member, said switch means for said control plate comprise a spring-biased switch on each side of said pivot axis in engagement with said control plate and holding said plate in a centered position in which said plate is in a plane substantially normal to both of said orthogonal planes.

References Cited by the Examiner

UNITED STATES PATENTS

| | | | |
|---|---|---|---|
| 2,754,411 | 7/1956 | Dohrmann | 200—6 X |
| 2,783,015 | 2/1957 | Kampa | 248—291 X |
| 2,863,010 | 12/1958 | Riedl | 200—6 X |
| 2,984,485 | 5/1961 | Brown | 248—121 X |
| 3,207,862 | 9/1965 | Robbins | 200—159 X |

References Cited by the Applicant

UNITED STATES PATENTS

| | | |
|---|---|---|
| 2,885,163 | 5/1959 | De Haven. |
| 2,945,648 | 7/1960 | Oplinger et al. |
| 3,011,739 | 12/1961 | Boyce et al. |
| 3,022,850 | 2/1962 | Bidwell et al. |
| 3,028,126 | 4/1962 | Holleman. |

ROBERT K. SCHAEFER, *Primary Examiner.*

ROBERT S. MACON, *Examiner.*

J. R. SCOTT, *Assistant Examiner.*